United States Patent
Ren

(10) Patent No.: US 9,398,627 B2
(45) Date of Patent: Jul. 19, 2016

(54) COMMUNICATION APPARATUS

(71) Applicant: Yongyong Ren, Nagoya (JP)

(72) Inventor: Yongyong Ren, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 177 days.

(21) Appl. No.: 14/039,241

(22) Filed: Sep. 27, 2013

(65) Prior Publication Data

US 2014/0094209 A1    Apr. 3, 2014

(30) Foreign Application Priority Data

Sep. 28, 2012 (JP) ................. 2012-218350

(51) Int. Cl.
*H04W 76/02* (2009.01)
*H04W 60/00* (2009.01)

(52) U.S. Cl.
CPC ............ *H04W 76/021* (2013.01); *H04W 60/00* (2013.01); *H04W 76/023* (2013.01)

(58) Field of Classification Search
CPC .. H04W 60/00; H04W 76/021; H04W 76/023
USPC ........................................................ 455/515
See application file for complete search history.

(56) References Cited

U.S. PATENT DOCUMENTS

| | | | |
|---|---|---|---|
| 6,005,869 A | 12/1999 | Sakai et al. | |
| 6,026,303 A | 2/2000 | Minamisawa | |
| 8,817,594 B2 | 8/2014 | Gero et al. | |
| 8,819,247 B2 * | 8/2014 | Hymel | H04L 67/04 709/227 |
| 8,886,195 B2 * | 11/2014 | Srinivasan | H04W 36/22 370/331 |
| 8,908,537 B2 | 12/2014 | Fedyk et al. | |
| 8,908,550 B2 | 12/2014 | Kwon et al. | |
| 2005/0086273 A1 | 4/2005 | Loebbert et al. | |
| 2005/0165795 A1 | 7/2005 | Myka et al. | |

(Continued)

FOREIGN PATENT DOCUMENTS

| | | |
|---|---|---|
| EP | 1550968 A1 | 7/2005 |
| EP | 2503840 A1 | 9/2012 |

(Continued)

OTHER PUBLICATIONS

Wi-Fi Alliance Technical Committee P2P Task Group, Wi-FI Peer-to-Peer (P2P) Technical Specification; Version 1.1; 2010.

(Continued)

*Primary Examiner* — Wesley Kim
*Assistant Examiner* — Raj Chakraborty
(74) *Attorney, Agent, or Firm* — Banner & Witcoff, Ltd.

(57) ABSTRACT

A communication apparatus includes: a processor execute receiving identification information of a first device of the slave station devices from the first device through the master station device; transmitting, in a specific case where the master station device is disconnected from the first wireless network and a specific instruction to perform communication of target data with the first device is provided, transmits a first type command to the first device by using the identification information, the first type command being a command for establishing a state where a transmission source device and a transmission destination device belong to a same wireless network; establishing, when the first type command is transmitted to the first device, a specific state, and performing, when the specific state has been established, communication of the target data with the first device by using the second wireless network.

7 Claims, 8 Drawing Sheets

(56) References Cited

U.S. PATENT DOCUMENTS

| | | |
|---|---|---|
| 2007/0242665 A1 | 10/2007 | Habetha et al. |
| 2009/0276531 A1 | 11/2009 | Myka et al. |
| 2012/0127855 A1 | 5/2012 | Alon et al. |
| 2012/0244902 A1 | 9/2012 | Saito et al. |
| 2014/0094209 A1 | 4/2014 | Ren |

FOREIGN PATENT DOCUMENTS

| | | |
|---|---|---|
| JP | H10145276 A | 5/1998 |
| JP | 2004129042 A | 4/2004 |
| JP | 2007512753 A | 5/2007 |
| WO | 2004107655 A1 | 12/2004 |
| WO | 2011003457 A1 | 1/2011 |

OTHER PUBLICATIONS

Jul. 6, 2015—(US) Notice of Allowance—U.S. Appl. No. 14/039,212.

Feb. 23, 2016—(JP) Notification of Reasons for Refusal—App 2012-218271, English translation.

Extended EP Searh Report mailed Mar. 20, 2014, EP Appln. 13186522.2.

Wi-Fi Alliance Technical Committe P2P Task Group, Wi-FI Peer-to-Peer (P2P) Technical Specification; Version 1.1; 2010.

Co-Pending U.S. Appl. No. 14/039,212, filed Sep. 27, 2013.

Mar. 3, 2015—(US) Non-Final Office Action—U.S. Appl. No. 14/039,212.

\* cited by examiner

COMMUNICATION APPARATUS

CROSS-REFERENCE TO RELATED APPLICATION

This application claims priority from Japanese Patent Application No. 2012-218350 filed on Sep. 28, 2012, the entire subject matter of which is incorporated herein by reference.

TECHNICAL FIELD

This disclosure discloses a communication apparatus that belongs to a wireless network and performs communication of target data.

BACKGROUND

There is a system having a first station, a second station and an access point. The first station transmits an invitation message to the second station through the access point. When the second station receives the invitation message, the second station transmits a response message to the first station through the access point. Thereby, the first station and the second station directly perform communication, without through the access point.

SUMMARY

This specification discloses a technology for enabling a pair of slave station devices to appropriately perform communication of target data when a master station device is disconnected from a wireless network to which the master station device and a plurality of slave station devices belong.

A communication apparatus of this disclosure, a processor; and memory storing instructions that, when executed by the processor, causes the processor to execute: receiving identification information of a first device from the first device through a master station device, at a state where a first wireless network has been established to which a master station device and a plurality of slave station devices belong, wherein the first device is one of the plurality of slave station devices; registering the identification information of the first device with the memory of the communication apparatus; transmitting a first type command to the first device by using the identification information of the first device registered in the memory, in a specific case where the master station device is disconnected from the first wireless network and a specific instruction to perform communication of target data with the first device is provided, a first type command to the first device by using the identification information of the first device in the memory the first type command being a command for establishing a state where a transmission source device, from which the first type command is transmitted, and a transmission destination device, to which the first type command is transmitted, belong to a same wireless network; establishing a first state, when the first type command is transmitted to the first device, wherein the first state is a state where the communication apparatus and the first device belong to a second wireless network different from the first wireless network, and performing, when the specific state has been established, communication of the target data with the first device by using the second wireless network.

According to the above configuration, at a state where the first wireless network has been established, the communication apparatus receives the identification information of the first device and registers the same with the memory. Therefore, for a specific case where the master station device is disconnected from the first wireless network and a specific instruction is provided, the communication apparatus can transmit the first type command to the first device by using the identification information of the first device in the memory. As a result, the communication apparatus can establish the specific state where the communication apparatus and the first device belong to the second wireless network. Also, the communication apparatus can perform communication of target data with the first device by using the second wireless network. According to this technology, when the master station device is disconnected from the wireless network, the communication apparatus can appropriately perform communication of target data with the first device by establishing the specific state.

A control method, a computer program and a computer-readable recording medium storing the computer program for implementing the communication apparatus are also novel and useful. Also, a system including the communication apparatus and the first device is also novel and useful.

BRIEF DESCRIPTION OF THE DRAWINGS

The foregoing and additional features and characteristics of this disclosure will become more apparent from the following detailed descriptions considered with the reference to the accompanying drawings, wherein.

DETAILED DESCRIPTION

First Illustrative Embodiment (Configuration of Communication System 2)

Figure 1:
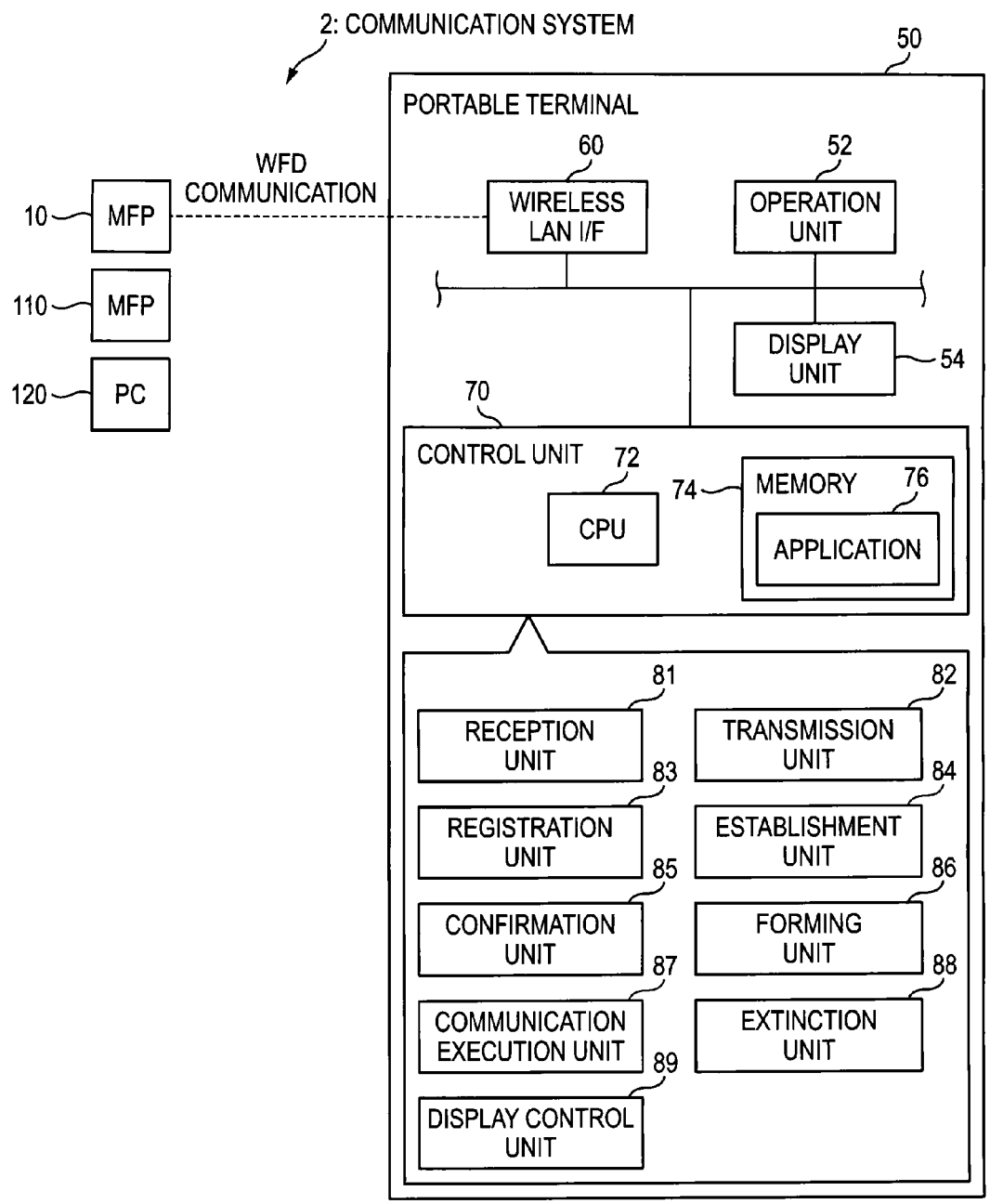
FIG. 1 illustrates a configuration of a communication system.

As shown in FIG. 1, a communication system 2 includes a plurality of MFPs (Multi-Function Peripherals) 10, 110, a portable terminal 50 and a personal computer (hereinafter, referred to as 'PC') 120.

(Types of Wireless Communication that can be Performed by Respective Devices 10, 50, 110, 120)

The respective devices 10, 50, 110, 120 can perform wireless communication based on a WFD (Wi-Fi Direct) mode and wireless communication based on a normal Wi-Fi mode. In the below, the wireless communications based on the respective methods are referred to as 'WFD communication' and 'normal W-Fi communication', respectively.

(WFD Communication)

The WFD mode is a wireless communication method that is set in the written standard 'Wi-Fi Peer-to-Peer (P2P) Technical Specification Version 1.1' prepared by the Wi-Fi Alliance. The WFD mode is a wireless communication method for performing wireless communication, based on IEEE (The Institute of Electrical and Electronics Engineers, Inc.) 802.11 standards and standards (for example, 802.11a, 11b, 11g, 11n and the like) acting on the 802.11 standards.

The respective devices 10, 50, 110, 120 belong to a WFD network (hereinafter, referred to as 'WFDNW'), thereby performing WFD communication of target data with another device belonging to the WFDNW. The target data is data including information of a network layer of an OSI reference model and information of an upper layer (for example, an application layer) of the network layer, and includes print data, scan data and the like, for example.

A device that can perform WFD communication, such as respective devices 10, 50, 110, 120, is referred to as 'WFD compatible device'. In the written standards of the WFD, three states of a Group Owner state (hereinafter, referred to as 'G/O state'), a client state (hereinafter, referred to as 'CL state') and a device state are defined as the WFD compatible device state. The WFD compatible device can selectively operate at one of the three states.

When newly establishing a wireless network, first and second WFD compatible devices normally perform wireless communication referred to as G/O negotiation. In the G/O negotiation, the first WFD compatible device (for example, the MFP 10) transmits information, which indicates a G/O priority of the first WFD compatible device, to the second WFD compatible device (for example, the PC 120) and receives information, which indicates a G/O priority of the second WFD compatible device, from the second WFD compatible device. The G/O priority of the first WFD compatible device is an index indicating a degree that the first WFD compatible device should be at the G/O state and is predetermined for the first WFD compatible device. Likewise, the G/O priority of the second WFD compatible device is an index indicating a degree that the second WFD compatible device should be at the G/O state.

The first WFD compatible device compares two G/O priorities to thus determine that a device having a higher priority becomes at the G/O state and that a device having a lower priority becomes at the CL state. The second WFD compatible device compares two G/O priorities to thus determine the G/O state and the CL state.

For example, it is assumed that the first WFD compatible device is at the G/O state and the second WFD compatible device is at the CL state. In this case, the first WFD compatible device first prepares WFD wireless setting information that should be used in the WFDNW. The WFD wireless setting information includes an authentication method, an encryption method, a password, an SSID (Service Set Identifier), a BSSID (Basic Service Set Identifier) and the like. The authentication method, the encryption method and the password that are included in the WFD wireless setting information is information that is used for authentication and encryption in the WFDNW. The SSID that is included in the WFD wireless setting information is a network identifier for identifying a WFDNW. The BSSID that is included in the WFD wireless setting information is a MAC address of a G/O device (i.e., the first WFD compatible device). Meanwhile, in the below, the WFD wireless setting information is referred to as WDFWSI (WFD Wireless Setting Information).

The method in which the first WFD compatible device (i.e., a G/O device) prepares WFDWSI is as follows. That is, the first WFD compatible device specifies an authentication method and an encryption method, which have been predetermined. The first WFD compatible device specifies a predetermined password or newly generates a password, thereby preparing a password. The first WFD compatible device specifies a predetermined SSID or newly generates an SSID, thereby preparing an SSID. The first WFD compatible device specifies a MAC address, which is allocated to the first WFD compatible device, as a BSSID.

The first WFD compatible device supplies the prepared WFDWSI to the second WFD compatible device. Thereby, the first and second WFD compatible devices perform authentication communication (i.e., communication of an Authentication Request signal, a 4-Way Handshake signal and the like) based on the WFDWSI. The first WFD compatible device (i.e., a G/O device) executes authentication of the second WFD compatible device (i.e., a CL device). When the authentication succeeds, connection is established between the first and second WFD compatible devices. The first WFD compatible device sets a MAC address of the second WFD compatible device in a management list of the first WFD compatible device. The management list is a list in which a MAC address of a CL device is set so as for a G/O device to manage the CL device.

As a result of the respective processing, the first WFD compatible device newly belongs to the WFDNW as a G/O device (i.e., it newly establishes a WFDNW) and the second WFD compatible device newly participates in the WFDNW as a CL device.

In a step where a WFDNW is newly established by the G/O negotiation, only one G/O device and one CL device belong to the WFDNW. At this time, the G/O device may establish connection with other device to thus enable the other device to newly participate in the WFDNW, as a CL device. In this case, two or more CL devices belong to the WFDNW. That is, in the WFDNW, one G/O device and one or more CL devices may exist. The G/O device manages one or more CL devices. Specifically, the G/O device sets MAC addresses of one or more CL devices in the management list in a memory of the G/O device. Also, when a CL device is disconnected from the WFDNW, the G/O device deletes the MAC address of the CL device from the management list. In the meantime, when the number of the CL devices becomes zero (that is, when the number of the MAC addresses of the CL devices set in the management list becomes zero), the G/O device is shifted from the G/O state to the device state and extinguishes the WFDNW.

The G/O device can perform wireless communication of target data with the CL device without through the other device. Also, the G/O device can relay wireless communication of the target data between a pair of CL devices. In other words, the pair of CL devices can perform wireless communication of the target data through the G/O device.

As described above, in the WFDNW, it is possible to perform wireless communication of the target data between the WFD compatible device of a transmission source of the target data and the WFD compatible device of a transmission destination of the target data, without through an AP (Access Point) separately configured from the WFD compatible devices. That is, it can be said that the WFD communication and the WFD mode are wireless communication without through an AP and a wireless communication method in which an AP is not used. In the meantime, the AP is a normal AP that is referred to as a wireless access point, a wireless LAN router and the like, and is different from a G/O device of the WFD mode and a so-called SoftAP of the normal Wi-Fi mode.

Also, the G/O device cannot perform wireless communication of the target data with a device-state device (i.e., the WFD compatible device at the device state) but can perform wireless communication of connection data for establishing connection with the device instrument. That is, the G/O device can perform wireless communication of connection data with the device-state device to thereby establish connection with the device instrument, thereby enabling the device-state device to newly participate in the WFDNW. In other words, the device-state device can perform wireless communication of connection data with the G/O device to thus establish connection with the G/O device, thereby newly participating in the WFDNW. In this case, the device-state device is shifted from the device state to the CL state (i.e., the device-state device participates in the WFDNW as a CL device). The connection data is data (i.e., data not including information of the network layer) including information of a lower layer (for example, a physical layer and a data link layer) of the network layer of the OSI reference model, and includes a Probe Request signal, a Probe Response signal, an Association Request signal, an Association Response signal, an Authentication Request signal, a 4-Way Handshake signal, an Invitation Request signal, an Invitation Response signal and the like.

Also, the G/O device cannot perform wireless communication of the target data with a WFD non-compatible device but can perform wireless communication of the connection data with a WFD non-compatible device. The WFD non-compatible device is a device that cannot operate in accordance with the WFD mode (i.e., a device that cannot selectively operate at any one of the three states of the WFD mode). The G/O device can perform wireless communication of the connection data with the WFD non-compatible device to thereby establish connection with the WFD non-compatible device, thereby enabling the WFD non-compatible device to newly participate in the WFDNW. In other words, the WFD non-compatible device can perform wireless communication of the connection data with the G/O device to thus establish connection with the G/O device, thereby newly participating in the WFDNW. Although the WFD non-compatible device does not selectively operate at any one of the three states (i.e., the G/O state, the CL state and the device state) but operates at the same state as the CL state while it belongs to the WFDNW.

(Normal Wi-Fi Communication)

The normal Wi-Fi mode is a wireless communication method that is defined by the Wi-Fi Alliance, and is different from the WFD mode. The normal Wi-Fi mode is a wireless communication method that performs wireless communication in accordance with IEEE 802.11 standards and standards (for example, 802.11a, 11b, 11g, 11n and the like) acting on the 802.11 standards, like the WFD mode.

However, as described above, while the WFD mode is a wireless communication method for performing wireless communication without through an AP, the normal Wi-Fi mode is a wireless communication method for performing wireless communication through an AP. Also, while the WFD mode is a wireless communication method having a structure of G/O negotiation, the normal Wi-Fi mode is a wireless communication method having no the structure. Also, while the WFD mode is a wireless communication method allowing a selective operation at any one of the three states (i.e., the G/O state, the CL state and the device state), the normal Wi-Fi mode is a wireless communication method not allowing the selective operation. In these regards, the WFD mode is different from the normal Wi-Fi mode.

A device that can perform normal Wi-Fi communication, such as respective devices 10, 50, 110, 120, is referred to as 'normal Wi-Fi compatible device'. When a normal Wi-FiNW is established by an AP, a normal Wi-Fi compatible device acquires normal Wi-Fi wireless setting information (hereinafter, referred to as 'normal Wi-FiWSI'), which is currently used in the normal Wi-FiNW, from the AP. The normal Wi-FiWSI is wireless setting information that is prepared by an AP, and includes an authentication method, an encryption method, a password, an SSID, a BSSID and the like, like the WFDWSI. The respective information is the same as the respective information included in the WFDWSI, except that it is used in the normal Wi-FiNW. In the meantime, the BSSID that is included in the normal Wi-FiWSI is a MAC address of an AP.

The normal Wi-Fi compatible device and the AP perform authentication communication, based on the normal Wi-FiWSI. When the AP executes authentication of the normal Wi-Fi compatible device and the authentication succeeds, connection is established between the AP and the normal Wi-Fi compatible device. Thereby, the normal Wi-Fi compatible device newly belongs to (participates in) the normal Wi-FiNW.

(Configuration of Portable Terminal 50)

Subsequently, a configuration of the portable terminal 50 will be described. The portable terminal 50 is a portable terminal apparatus such as a portable phone (for example, smart phone), a PDA, a notebook PC, a tablet PC, a portable music reproduction apparatus, a portable moving picture reproduction apparatus and the like. The portable terminal 50 can perform WFD communication and normal Wi-Fi communication.

The portable terminal 50 has an operation unit 52, a display unit 54, a wireless LAN interface (hereinafter, an interface is referred to as 'I/F') 60 and a control unit 70. The respective units 52 to 70 are connected to a bus line (a reference numeral thereof is omitted). The operation unit 52 has a plurality of keys. A user can input a variety of instructions to the portable terminal 50 by operating the operation unit 52. The display unit 54 is a display for displaying a variety of information.

The wireless LAN I/F 60 is an interface for performing WFD communication and normal Wi-Fi communication. The wireless LAN I/F 60 is physically one interface (i.e., one IC chip). The wireless LAN I/F 60 is allotted with only one MAC address.

The control unit 70 has a CPU 72 and a memory 74. The memory 74 consists of a ROM, a RAM, a hard disk drive and the like. The CPU 72 executes a variety of processing in response to programs stored in the memory 74. The program in the memory 74 includes an application 76 for enabling the MFPs 10, 110 to execute various functions (for example, print function, scan function and the like). The application 76 may be installed into the portable terminal 50 from a server, which is provided by vendors of the MFPs 10, 110, or may be installed into the portable terminal 50 from a media, which is shipped together with the MFPs 10, 110. The CPU 72 executes the processing in response to the application 76, so that functions of respective units 81 to 89 are implemented.

The memory 74 further stores therein a WFD state value indicating a current state (i.e., any one of the G/O state, the CL state and the device state) of the portable terminal 50 relating to the WFD. When the portable terminal 50 belongs to the WFDNW (i.e., when the WFD state value indicates the G/O state or CL state), the memory 74 further stores therein WFD-WSI that is currently used in the WFDNW. Also, when the portable terminal 50 belongs to the normal Wi-FiNW, the memory 74 further stores therein normal Wi-FiWSI that is currently used in the normal Wi-FiNW.

(Other Devices 10, 110, 120)

The MFPs 10, 110 are peripheral devices capable of executing multi-functions including a print function, a scan function and the like. The MFPs 10, 110 can perform WFD communication and normal Wi-Fi communication. The PC 120 has an OS (Operating System) program. The PC 120 can perform WFD communication and normal Wi-Fi communication in response to the OS program.

Like the portable terminal 50, the respective devices 10, 110, 120 are also allotted with MAC addresses. The respective MAC addresses allotted to the respective devices 10, 50, 110, 120 are different.

Figure 2:
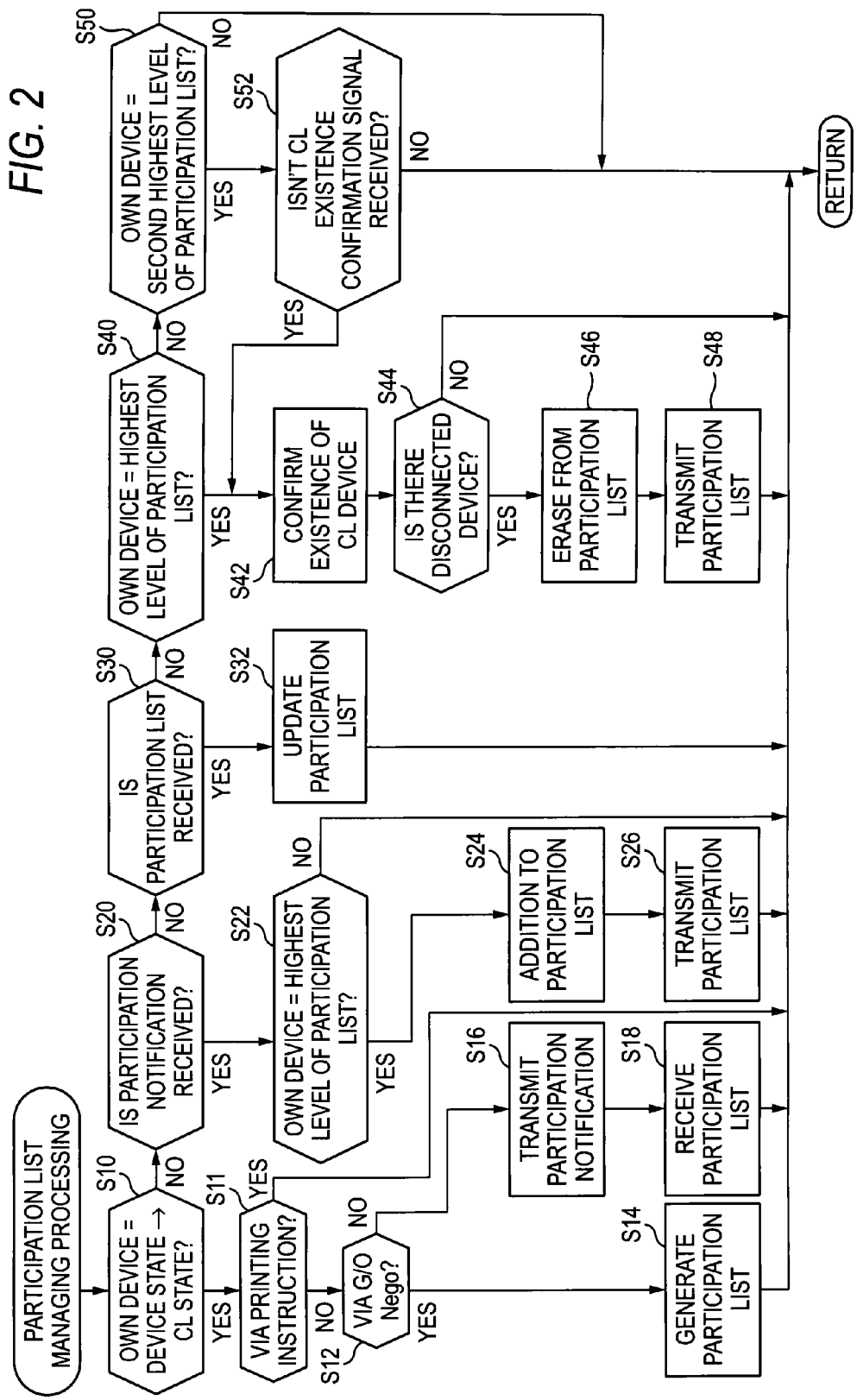
FIG. 2 illustrates a flowchart of participation list managing processing.

(Participation List Managing Processing; FIG. 2)

Subsequently, participation list managing processing that is executed by the portable terminal 50 is described with reference to FIG. 2. Like the portable terminal 50, the MFPs 10, 110 also execute the participation list managing processing. The participation list managing processing is processing that is executed by the CL device. That is, the G/O device and the device instrument do not execute the participation list managing processing.

The participation list is a list in which MAC addresses, model names and node names (hereinafter, referred to as 'device information') of the respective CL devices belonging to the WFDNW are described. As described above, the G/O device has a management list in which the MAC addresses of the respective CL devices are described. The participation list is different from the management list, in that not only the MAC addresses but the model names and the node names are described. Also, the participation list is different from the management list, in that it is carried by the respective CL devices.

Although described later, in the participation list, the device information of a CL device (i.e., a CL device in which a WFD connection operation (which will be described later) for participating in the WFDNW has been first executed) earlier belonging to the WFDNW is described in a higher level. For example, a situation where a WFDNW to which a G/O device (for example, the PC 120), a first CL device (for example, the MFP 10) and a second CL device (for example, the MFP 110) belong is formed is assumed. When the first CL device is first enabled to belong to the WFDNW and the second CL device is then enabled to belong to the WFDNW, the device information of the first CL device is described in the highest level of the participation list and the device information of the second CL device is described in the second highest level of the participation list. In the meantime, the device information of the G/O device is not described in the participation list.

In S10, the control unit 70 determines whether the state of the portable terminal 50 is shifted from the device state to the CL state. As described above, the participation list managing processing is processing that is not executed by the device instrument but is executed by the CL device. Therefore, after the participation list managing processing starts as a result of the shift of the portable terminal 50 from the device state to the CL state, when the processing of S10 is executed for the first time, the control unit 70 determines YES in S10 and proceeds to S11.

In S11, the control unit 70 determines whether the portable terminal 50 is shifted to the CL state in S10, as a result that a user inputs a printing instruction (for example, refer to S308 of FIG. 5) (which will be described later). When the portable terminal is shifted to the CL state as a result that a printing instruction is input, the control unit 70 determines YES in S11, skips over S12 to S18 and returns to S10. The reason of skipping over S12 to S18 will be described later (the reason will be described in processing of FIG. 5). On the other hand, when the portable terminal 50 is shifted to the CL state in S10 (for example, shift in S124 of FIG. 3) even though a printing instruction is not input, the control unit 70 determines NO in S11 and proceeds to S12.

In S12, the control unit 70 determines whether the portable terminal 50 is shifted to the CL state by executing the G/O negotiation. When the portable terminal 50 is shifted to the CL state in S10 by executing the G/O negotiation, the control unit 70 determines YES in S12 and proceeds to S14. Since a WFDNW is newly formed as a result of the G/O negotiation, the description that the portable terminal 50 executes the G/O negotiation to thus belong to the WFDNW as a CL device (i.e., a result of the determination in S12 is YES) means that the first CL device belonging to the WFDNW is the portable terminal 50.

As described above, the YES determination in S12 means that the first CL device (in the below, referred to as 'earliest CL device') belonging to the WFDNW is the portable terminal 50. In this situation, in S14, the control unit 70 generates a new participation list in which the device information of the portable terminal 50 is described and stores the new participation list in the memory 74. At the time of S14, the new participation list includes only the device information of the portable terminal 50. That is, the device information of the portable terminal 50 is described in the highest level of the participation list. In the meantime, at the time of S14, when an old participation list has been stored in the memory 74, the control unit 70 deletes the old participation list from the memory 74 and stores the new participation list in the memory 74. When the processing of S14 is over, the control unit 70 returns to S10.

Figures 3, 3A, 3B:
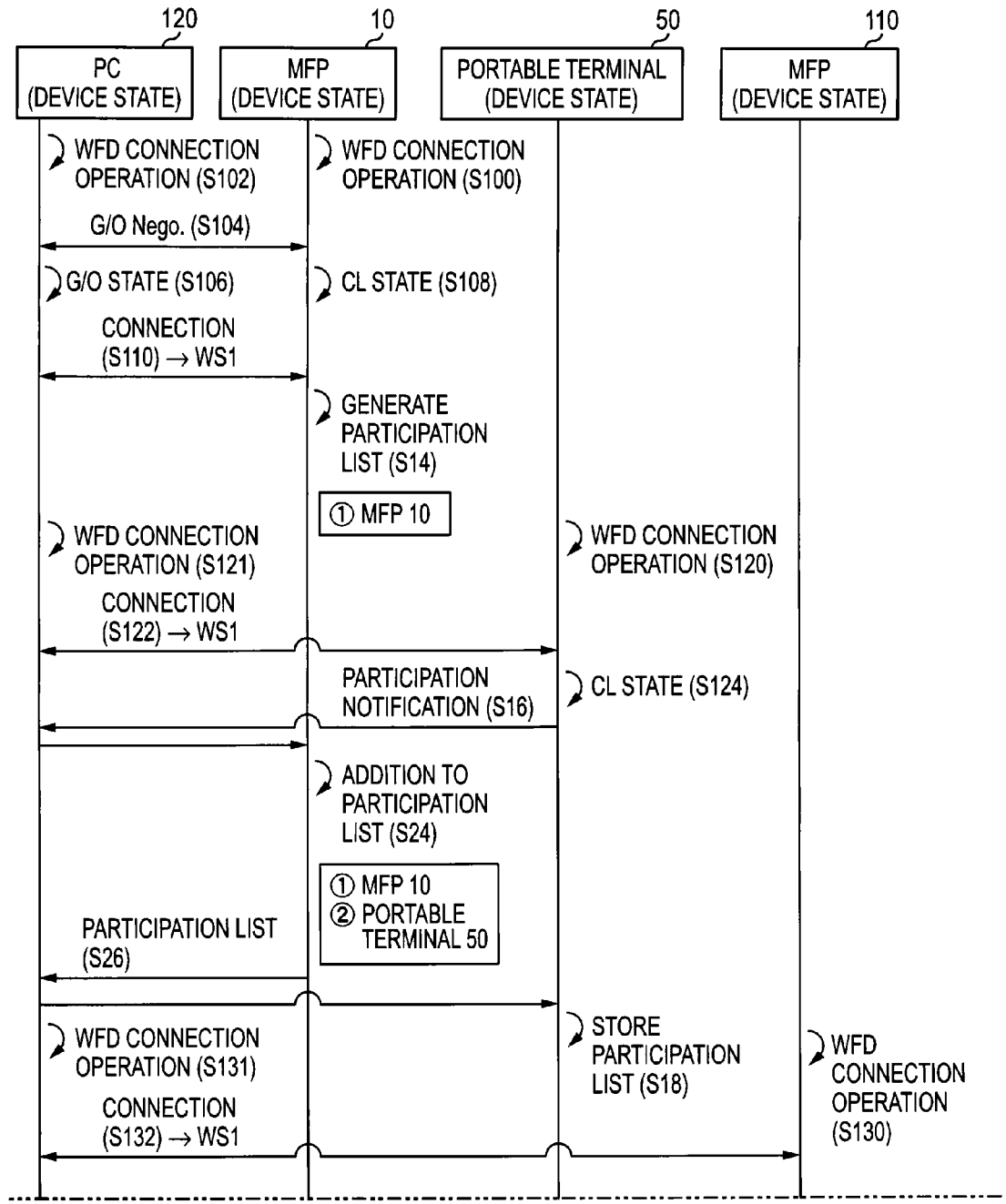
FIG. 3 is a sequence diagram illustrating an aspect of establishing a wireless network.
Figure 3B:
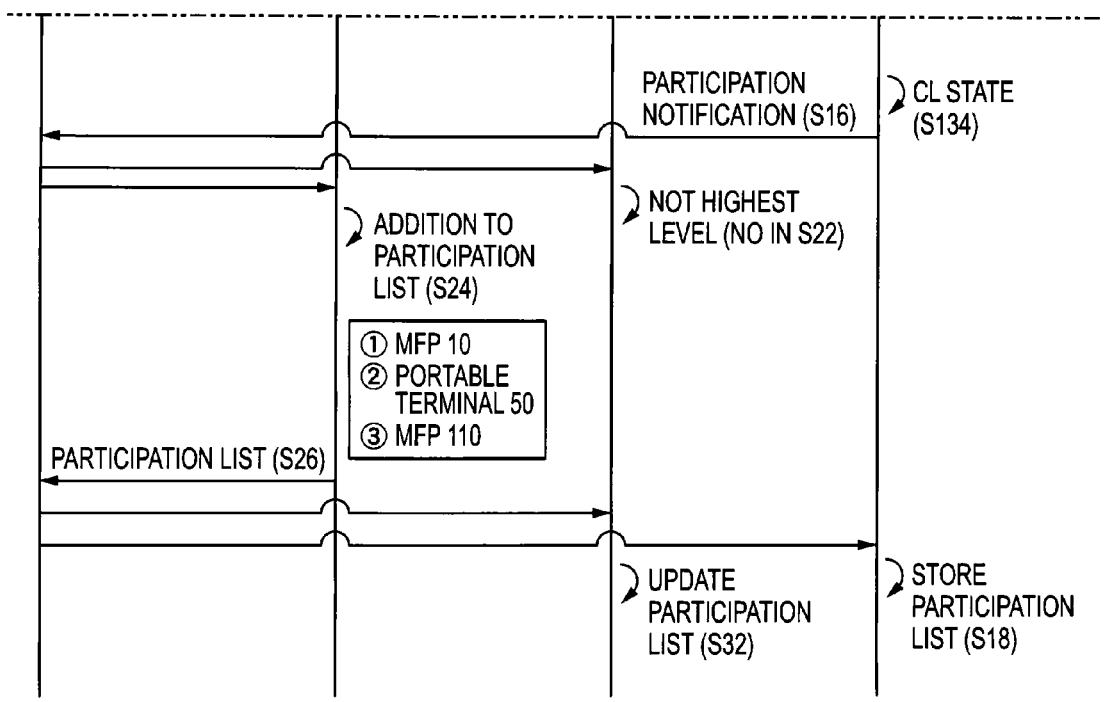

On the other hand, when it is determined that the portable terminal 50 is shifted to the CL state without executing the G/O negotiation, the control unit 70 determines NO in S12 and proceeds to S16. When a WFD connection operation for enabling the portable terminal 50 to newly participate in the existing WFDNW is applied (for example, when a WFD connection operation of S120 in FIG. 3 is applied, which will be described later), the portable terminal 50 at the device state newly participates in the existing WFDNW without executing the G/O negotiation and is thus shifted to the CL state. When the portable terminal 50 is shifted to the CL state under such situation, the control unit 70 determines NO in S12.

In the above situation, when the portable terminal 50 at the device state newly participates in the existing WFDNW, the CL device (for example, the MFP 10 of FIG. 3, which will be described later) has already belonged to the WFDNW. Therefore, the portable terminal 50 is not the earliest CL device that has earliest participated in the WFDNW. In this situation, as described in S14, the earliest CL device has already generated the participation list. As described later, when the earliest CL device receives a participation notification from a CL device newly belonging to the WFDNW after generating the participation list, it adds the device information of the CL device to the participation list to thereby generate an updated participation list (S24). The earliest CL device further transmits the updated participation list to the other CL device belonging to the WFDNW (S26).

In S16, the control unit 70 broadcasts a participation notification, which indicates that the portable terminal 50 newly participates in the WFDNW, to the WFDNW so as to acquire the updated participation list from the earliest CL device. The participation notification includes the device information of the portable terminal 50. The participation notification is transmitted to the respective CL devices (i.e., the respective CL devices different from the portable terminal 50) belonging to the WFDNW through the G/O device.

When the earliest CL device receives the participation notification from the portable terminal 50, it describes the device information of the portable terminal 50 in the lowest level of the participation list to thereby generate an updated participation list. Then, the earliest CL device broadcasts the updated participation list to the WFDNW.

In S18, a reception unit 81 receives the participation list from the earliest CL device. As described above, the device information of the portable terminal 50 is described in the lowest level of the received participation list. In S18, a registration unit 83 stores the received participation list in the memory 74. In the meantime, when the old participation list has been stored in the memory 74, the control unit 70 deletes the old participation list from the memory 74 and stores the received participation list in the memory 74. When the processing of S18 is over, the control unit returns to S10.

In S20, the reception unit 81 monitors whether the participation notification is received. When a new CL device different from the portable terminal 50 participates in the WFDNW, the new CL device broadcasts the participation notification including the device information of the new CL device to the WFDNW (S16). In this case, the reception unit 81 receives the participation notification from the new CL device through the G/O device. As a result, the control unit determines YES in S20 and proceeds to S22.

In S22, the control unit 70 determines whether the device information of the portable terminal 50 is described in the highest level of the participation list in the memory 74. That is, the control unit 70 determines whether the portable terminal 50 is the earliest CL device or not. When the portable terminal 50 is the earliest CL device, the control unit 70 determines YES in S22 and proceeds to S24. When the portable terminal 50 is not the earliest CL device, the control unit 70 determines NO in S22, skips over S24 to S26 and returns to S10.

In S24, the registration unit 83 describes the device information (i.e., the device information of the new CL device) included in the participation notification in the lowest level of the participation list to thereby generate an updated participation list. Thereby, the updated participation list is stored in the memory 74.

Then, in S26, the control unit 70 broadcasts the updated participation list to the WFDNW. The participation list is transmitted to the respective CL devices (i.e., the respective CL devices different from the portable terminal 50) belonging to the WFDNW through the G/O device. As a result, the respective CL devices receive and store the participation list in S18 or update the participation list in S32. When the processing of S26 is over, the control unit returns to S10.

In S30, the reception unit 81 monitors whether the participation list is received. In S26 or S48 (which will be described later), the earliest CL device different from the portable terminal 50 can broadcast the participation list to the WFDNW. In this case, the reception unit 81 receives the participation list from the earliest CL device through the G/O device. As a result, the control unit determines YES in S30 and proceeds to S32.

In S32, the registration unit 83 deletes the old participation list from the memory 74 and stores the received participation list in the memory 74. Thereby, the registration unit 83 can update the participation list. When the processing of S32 is over, the control unit returns to S10.

In S40, the control unit 70 determines whether the device information of the portable terminal 50 is described in the highest level of the participation list in the memory 74. That is, the control unit 70 determines whether the portable terminal 50 is the earliest CL device. When the portable terminal 50 is the earliest CL device, the control unit 70 determines YES in S40 and proceeds to S42.

In S42, the control unit 70 executes an existence confirmation of the respective CL device different from the portable terminal 50 that is the earliest CL device. Specifically, the control unit 70 first transmits each CL existence confirmation signal, which includes, as a transmission destination, each MAC address described in the second highest level or lower of the participation list, to the G/O device. Each CL existence confirmation signal is transmitted to each CL device through the G/O device.

When each CL device receives the CL existence confirmation signal from the portable terminal 50, it transmits a response signal, which includes the MAC address of the CL device, to the portable terminal 50 through the G/O device. However, for example, when a power supply of the CL device is off, when the CL device is located at a position at which it cannot perform wireless communication with the G/O device, and the like, the CL device is disconnected from the WFDNW. Since the disconnected device does not receive the CL existence confirmation signal, it does not transmit a response signal to the portable terminal 50. Therefore, the control unit 70 can determine whether there is a disconnected device in the respective CL devices registered with the participation list, by monitoring whether a response signal is received.

In S44, the control unit 70 determines whether there is a disconnected device. When there is a disconnected device, the control unit 70 determines YES in S44 and proceeds to S46. On the other hand, when there is no disconnected device, the control unit 70 determines NO in S44, skips over S46 and S48 and returns to S10.

In S46, the registration unit 83 erases the device information of the disconnected device from the participation list in the memory 74, thereby generating an updated participation list.

Then, in S48, the control unit 70 broadcasts the updated participation list to the WFDNW. The participation list is transmitted to the respective CL devices (i.e., the respective CL devices except for the disconnected device, which are different from the portable terminal 50) belonging to the WFDNW, through the G/O device. As a result, the respective CL devices update the participation list (S32).

Whenever the control unit 70 determines YES in S40, it executes processing of S42 to S48. That is, the control unit 70 repeatedly confirms whether the CL device exists. For example, in a situation where an interval for executing the determination of S40 is substantially constant, the control unit 70 periodically confirms whether the CL device exists. When the processing of S48 is over, the control unit 70 returns to S10.

As described above, in S40 to S48, the portable terminal 50 that is the earliest CL device confirms whether the CL device exists. In other words, when the earliest CL device is another CL device different from the portable terminal 50, the portable terminal 50 confirms whether another CL device exists. However, there is a possibility that another CL device will be disconnected from the WFDNW. In this case, there is no CL device executing the existence confirmation, so that the participation list is not updated. In order to suppress this situation, the control unit 70 executes processing of S50 and S52, which will be described later.

In S50, the control unit 70 determines whether the portable terminal 50 is at a second highest state (i.e., the device information of the portable terminal 50 is described in the second highest level of the participation list). When the portable terminal 50 is at a second highest state, the control unit 70 determines YES in S50 and proceeds to S52. On the other hand, when the portable terminal 50 is not at a second highest state, the control unit 70 determines NO in S50, skips over S52 and returns to S10.

In S52, the control unit 70 determines whether a state during which the CL existence confirmation signal is not received continues for a predetermined time period. When the earliest CL device is disconnected from the WFDNW, the CL existence confirmation signal is not transmitted from the earliest CL device. In this case, since the CL existence confirmation signal is not received for the predetermined time period, the control unit 70 determines YES in S52 and executes S42 to S48.

That is, the control unit 70 transmits the CL existence confirmation signal, instead of the earliest CL device (S42). As a result, the control unit determines that the earliest CL device is disconnected from the WFDNW (YES in S44). Then, the registration unit 83 erases the device information of the earliest CL device from the participation list in the memory 74 to thereby generate an updated participation list (S46). As a result, in the updated participation list, the device information of the portable terminal 50 is described in the highest level. That is, the portable terminal 50 becomes the earliest CL device. Then, the control unit 70 broadcasts the updated participation list to the WFDNW (S48).

In the meantime, like the portable terminal 50, the MFPs 10, 110 execute the participation list managing processing of FIG. 2. Since the respective devices 10, 50, 110 execute the participation list managing processing, when each device 10 and the like are the CL devices, the respective devices 10 and the like can carry therein the participation list in which the device information of the respective devices 10 and the like is described.

Figure 5:
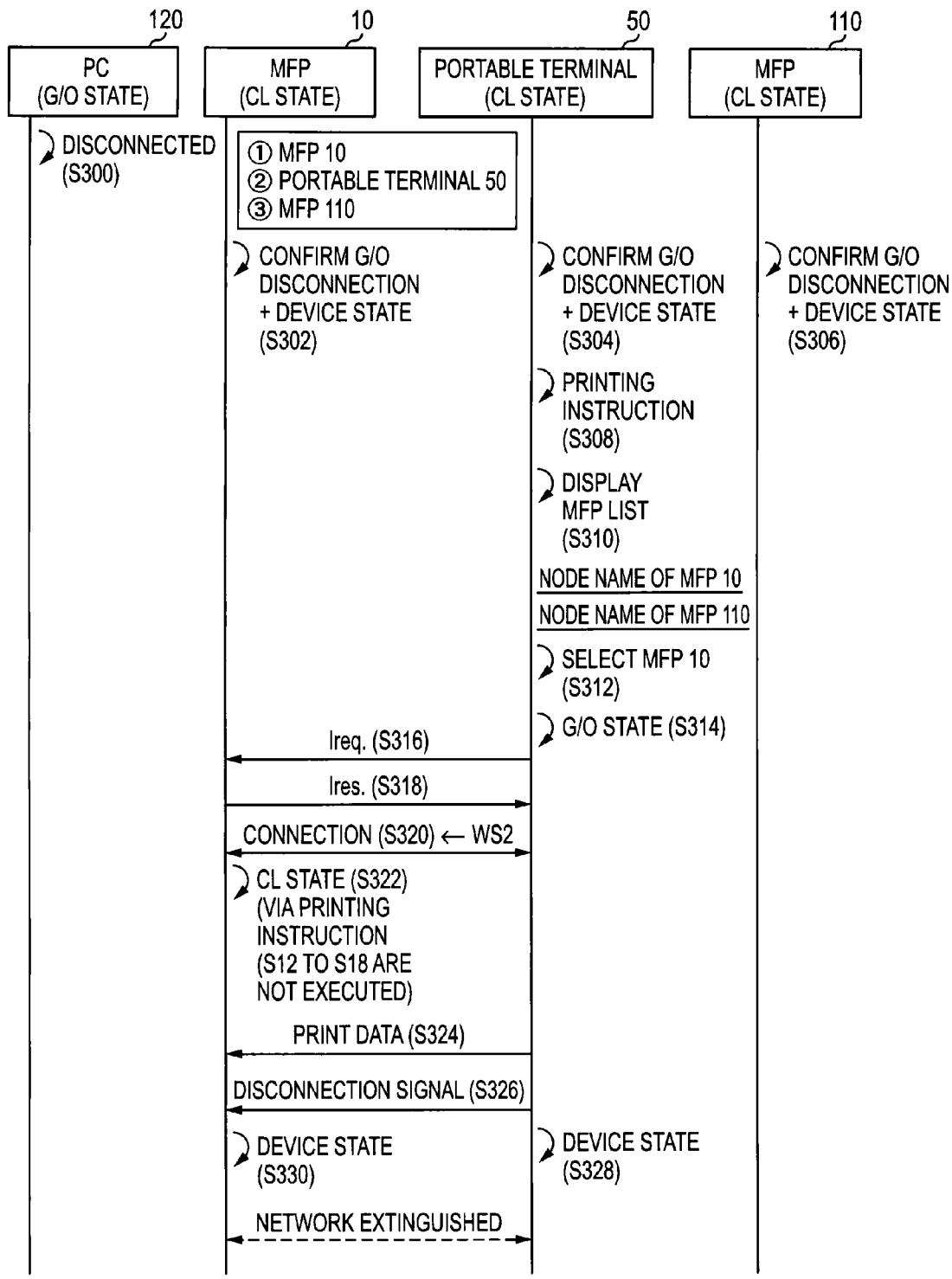
FIG. 5 is a sequence diagram of a case A (i.e., a case where an Ireq signal is used) of a first illustrative embodiment.

In the meantime, the PC 120 does not execute the participation list managing processing. Therefore, it is not necessary to install a special program (for example, the application 76 of the portable terminal 50) for executing the participation list managing processing in the PC 120. Since the PC 120 does not execute the participation list managing processing, the device information of the PC 120 is not described in the participation list even though the PC 120 belongs to the WFDNW as a CL device. However, in this illustrative embodiment, even though the PC 120 does not execute the participation list managing processing, when the G/O device is disconnected from the WFDNW, as shown in FIG. 5, for example, it is possible to appropriately communicate print data between the portable terminal 50 and the MFP (for example, the MFP 10) that should execute a printing operation. That is, the technology of the illustrative embodiment effectively functions not only in a situation where the WFDNW is established to which only the respective devices 10, 50, 110 capable of executing the participation list managing processing belong but also in a situation where the WFDNW is established to which the device 120, which cannot execute the participation list managing processing, also belongs. Meanwhile, in a modified embodiment, the PC 120 may have the special program and execute the participation list managing processing.

(Aspect of Establishing WFDNW; FIG. 3)

At an initial state of FIG. 3, a WFDNW is not formed and the respective devices 10, 50, 110, 120 are at the device state.

In S100, a user applies a WFD connection operation for enabling the MFP 10 to belong to the WFDNW to the MFP 10. Specifically, the user selects an item indicating 'wireless connection of the WFD mode' from a plurality of items (for example, 'wireless connection of the WFD mode' and 'wireless connection of the normal Wi-Fi mode') included in a screen that is displayed on the MFP 10. In S102, the user applies, to the PC 120, a WFD connection operation (i.e., an operation of selecting an item indicating 'wireless connection of the WFD mode') for enabling the PC 120 to belong to the WFDNW.

In S104, the MFP 10 executes the G/O negotiation with the PC 120. In S106, the PC 120 determines that the PC 120 is at the G/O state as a result of the G/O negotiation. Also, in S108, the MFP 10 determines that the MFP 10 is at the CL state as a result of the G/O negotiation.

In S110, the PC 120 prepares WFDWSI (hereinafter, referred to as 'WS1') that should be used in the WFDNW and supplies the WS1 to the MFP 10. As a result, connection is established between the PC 120 and the MFP 10. Thereby, the PC 120 newly establishes a WFDNW (hereinafter, referred to as 'first WFDNW') as the G/O device and the MFP 10 participates in the first WFDNW as the CL device.

In the situation of FIG. 3, although the MFP 10 is shifted from the device state to the CL state (YES in S10 of FIG. 2), a printing instruction has not been provided to the portable terminal 50 (NO in S11). Also, the MFP 10 is shifted from the device state to the CL state by executing the G/O negotiation (YES in S12). Therefore, the MFP 10 is the earliest CL device in the first WFDNW and generates the participation list in which the device information of the MFP 10 is described in the highest level (S14). In the meantime, in respective figures (FIGS. 3 to 7) after FIG. 3, the participation list is expressed with a rectangular box having no reference numeral attached thereto and a ranking of the participation list (i.e., an order participating in the WFDNW) is expressed with a number in a circle. The 'MFP 10', the 'MFP 110' and the 'portable terminal 50' of the participation list mean that the device information of the MFP 10, the device information of the MFP 110 and the device information of the portable terminal 50 are described in the participation list.

Then, in S120, the user applies, to the portable terminal 50, a WFD connection operation (i.e., an operation of selecting an item indicating 'wireless connection of the WFD mode') for enabling the portable terminal 50 to belong to the first WFDNW. In this case, the control unit 70 of the portable terminal 50 transmits a connection request to the PC 120 that is a G/O device. Also, in S121, the user applies the WFD connection operation (i.e., an operation of selecting an item indicating 'wireless connection of the WFD mode') to the PC 120 that is a G/O device, too. Thereby, in S122, when the PC 120 receives the connection request from the portable terminal 50, the PC supplies the WS1, which is currently used in the first WFDNW, to the portable terminal 50. As a result, connection is established between the PC 120 and the portable terminal 50. The control unit 70 of the portable terminal 50 stores the WFD state value indicating the CL state and the WS1 in the memory 74. Thereby, in S124, the portable terminal 50 is shifted from the device state to the CL state and newly participates in the first WFDNW, as a CL device.

The portable terminal 50 is not provided with a printing instruction and is shifted from the device state to the CL state without executing the G/O negotiation (YES in S10 of FIG. 2, NO in S11 and NO in S12). Hence, the control unit 70 of the portable terminal 50 broadcasts the participation notification including the device information of the portable terminal 50 (S16).

The MFP 10 receives the participation notification from the portable terminal 50 through the PC 120 (YES in S20 of FIG. 2). Since the MFP 10 is the earliest CL device (YES in S22), the MFP 10 adds the device information of the portable terminal 50 to the lowest level of the participation list (S24). Then, the MFP 10 broadcasts the participation list to the first WFDNW (S26).

The reception unit 81 of the portable terminal 50 receives the participation list from the MFP 10 through the PC 120 (S18 in FIG. 2). Then, the registration unit 83 of the portable terminal 50 stores the participation list in the memory 74 (S18).

Then, in S130, the user applies, to the MFP 110, a WFD connection operation (i.e., an operation of selecting an item indicating 'wireless connection of the WFD mode') for enabling the MFP 110 to belong to the first WFDNW. In this case, the MFP 110 transmits a connection request to the PC 120 that is a G/O device. Also, in S131, the user applies the WFD connection operation (i.e., an operation of selecting an item indicating 'wireless connection of the WFD mode') to the PC 120 that is a G/O device, too. Thereby, in S132, when the PC 120 receives the connection request from the MFP 110, the PC supplies the WS1, which is currently used in the first WFDNW, to the MFP 110. As a result, connection is established between the PC 120 and the MFP 110. Thereby, in S134, the MFP 110 is shifted to the CL state and newly participates in the first WFDNW, as a CL device.

In the situation of FIG. 3, although the MFP 110 is shifted from the device state to the CL state (YES in S10 of FIG. 2), a printing instruction has not been provided to the portable terminal 50 (NO in S11). Also, the MFP 10 is shifted from the device state to the CL state without executing the G/O negotiation (NO in S12). Therefore, the MFP 110 broadcasts the participation notification including the device information of the MFP 110 (S16).

The reception unit 81 of the portable terminal 50 receives the participation notification from the portable terminal 50 through the PC 120 (S20 in FIG. 2). Since the portable terminal 50 is not the earliest CL device (NO in S22), the control unit 70 of the portable terminal 50 does not execute the processing of S24 and S26 even though it receives the participation notification.

The MFP 10 receives the participation notification from the portable terminal 50 through the PC 120 (S20 of FIG. 2). Since the MFP 10 is the earliest CL device (YES in S22), the MFP 10 describes the device information of the MFP 110 in the lowest level of the participation list to thereby generate an updated participation list (S24). Then, the MFP 10 broadcasts the updated participation list to the first WFDNW (S26).

The reception unit 81 of the portable terminal 50 receives the participation list from the MFP 10 through the PC 120 (YES in S30 of FIG. 2). Then, the registration unit 83 of the portable terminal 50 updates the participation list in the memory 74 (S32).

The MFP 110 receives the participation list from the MFP 10 through the PC 120 (S18 in FIG. 2). Then, the MFP 110 stores the participation list in a memory (not shown) of the MFP 110 (S18).

As described above, when the respective processing of FIG. 3 is executed, the first WFDNW is established in which the PC 120 is a G/O device and the MFPs 10, 110 and the portable terminal 50 are CL devices. Thereby, the portable terminal 50 can transmit the print data to the MFP 10 through the PC 120 (i.e., G/O device) by using the first WFDNW so as to enable the MFP 10 to perform a printing operation. In this case, the MFP 10 receives the print data from the portable terminal 50 through the PC 120 (i.e., G/O device) by using the first WFDNW. Then, the MFP 10 prints an image, which is expressed by the print data, on a printing medium.

Figure 4:
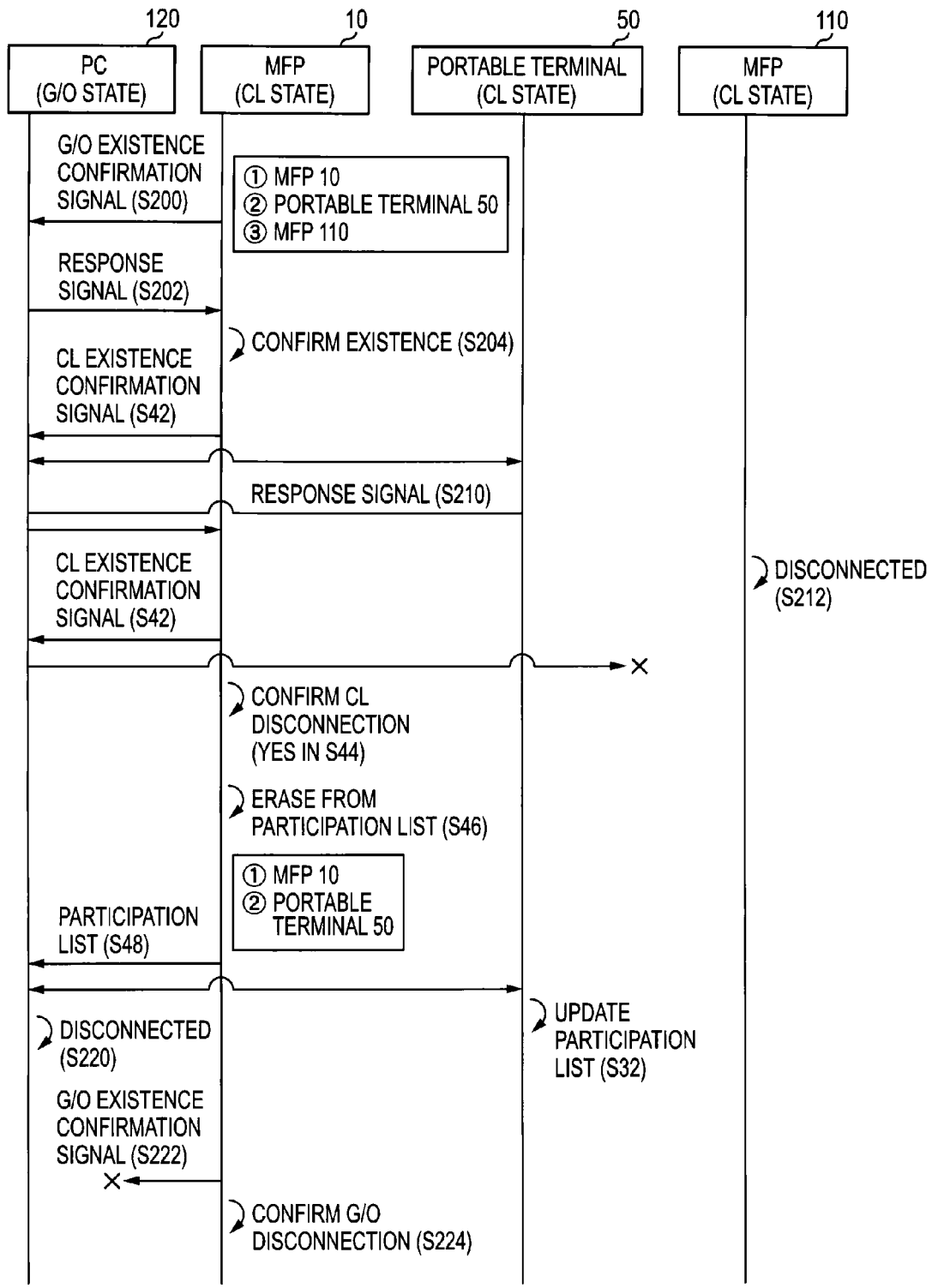
FIG. 4 is a sequence diagram illustrating an aspect of confirming whether a G/O device and a client device exist.

(Aspect of Confirming Whether G/O Device and Client Device Exist; FIG. 4)

Subsequently, respective processing for confirming whether the G/O device and the client device exist is described with reference to FIG. 4. At an initial state of FIG. 4, the first WFDNW is established in which the PC 120 is a G/O device and the MFPs 10, 110 and the portable terminal 50 are CL devices. The participation list includes the respective device information of the MFP 10, the portable terminal 50 and the MFP 110 in order from the higher level.

Each CL device normally confirms whether a G/O device exists. Therefore, in S200, the MFP 10 that is a CL device confirms whether there is the PC 120 that is a G/O device. Specifically, the MFP 10 transmits a G/O existence confirmation signal to the PC 120.

In the step of S200 in which the G/O existence confirmation signal is transmitted, the PC 120 is not disconnected from the first WFDNW. Thus, in S202, the PC 120 receives the G/O existence confirmation signal from the MFP 10 and transmits a response signal to the MFP 10.

In S204, since the MFP 10 receives the response signal from the PC 120, the MFP 10 confirms that the PC 120 belongs to the first WFDNW, i.e., the PC 120 is not disconnected from the first WFDNW. In the meantime, the MFP 10 repeatedly confirms whether the G/O device (i.e., the PC 120) exists. For example, in a situation where an interval for executing the existence confirmation of the G/O device is substantially constant, the MFP 10 periodically confirms whether the G/O device exists.

Although not shown in FIG. 4, a confirmation unit 85 of the portable terminal 50 also transmits the G/O existence confirmation signal to the PC 120 to thus repeatedly confirm whether the G/O device (i.e., the PC 120) exists, like the MFP 10. The MFP 110 also repeatedly confirms whether the G/O device (i.e., the PC 120) exists, like the MFP 10.

In the example of FIG. 4, the MFP 10 is the earliest CL device. Therefore, the MFP 10 confirms whether the respective CL devices (i.e., the portable terminal 50 and the MFP 110) different from the MFP 10 exist (YES in S40 of FIG. 2, S42). Specifically, the MFP 10 transmits a CL existence confirmation signal, which includes, as a transmission destination, the MAC address of the portable terminal 50 described in the second highest level of the participation list, to the PC 120.

Since the portable terminal 50 is not disconnected from the first WFDNW, the control unit 70 of the portable terminal 50 receives the CL existence confirmation signal from the MFP 10 through the PC 120. In this case, in S210, the control unit 70 transmits a response signal, which includes the MAC address of the portable terminal 50, to the MFP 10 through the PC 120.

Since the MFP 10 receives the response signal from the portable terminal 50, the MFP 10 confirms that the portable terminal 50 belongs to the first WFDNW, i.e., the portable terminal 50 is not disconnected from the first WFDNW. Then, the MFP 10 transmits a CL existence confirmation signal, which includes, as a transmission destination, the MAC address of the MFP 110 described in the lowest level of the participation list, to the PC 120.

For example, as a power supply of the MFP 110 becomes off, the MFP 110 is disconnected from the first WFDNW, in S212. In this case, since the MFP 110 does not receive a CL existence confirmation signal, it does not transmit a response signal.

Since the MFP 10 does not receive a response signal from the MFP 110, it confirms that the MFP 110 does not belong to the first WFDNW, i.e., the MFP 110 is disconnected from the first WFDNW (YES in S44 of FIG. 2). In this case, the MFP 10 erases the device information of the MFP 110 from the participation list (S46). Then, the MFP 10 broadcasts the participation list to the first WFDNW (S48).

The reception unit 81 of the portable terminal 50 receives the participation list from the MFP 10 through the PC 120 (YES in S30 of FIG. 2). Then, the registration unit 83 of the portable terminal 50 updates the participation list in the memory 74 (S32).

For example, as a power supply of the PC 120 that is a G/O device becomes off, the PC 120 is disconnected from the first WFDNW, in S220. After that, in S222, the MFP 10 transmits a G/O existence confirmation signal to the PC 120. However, since the PC 120 does not receive a G/O existence confirmation signal, it does not transmit a response signal. In S224, since the MFP 10 does not receive a response signal from the PC 120, it confirms that the PC 120 does not belong to the first WFDNW, i.e., the PC 120 is disconnected from the first WFDNW.

In the meantime, although not shown in FIG. 4, the confirmation unit 85 of the portable terminal 50 also transmits the G/O existence confirmation signal to the PC 120, it does not receive a response signal. As a result, the confirmation unit 85 of the portable terminal 50 confirms that the PC 120 is disconnected from the first WFDNW.

As described above, the CL device such as the MFP 10 and the portable terminal 50 can appropriately confirm whether the PC 120 (i.e., a G/O device) is disconnected from the first WFDNW by transmitting the G/O existence confirmation signal to the PC 120 (i.e., a G/O device) and determining whether the response signal is received from the PC 120. As a result, the portable terminal 50 can transmit an Ireq signal (which will be described later) at appropriate timing (i.e., it is possible to suppress an Ireq signal from being transmitted even though the PC 120 is not disconnected from the first WFDNW). In the below, processing that is executed by the CL device when the PC 120 (i.e., a G/O device) is disconnected from the first WFDNW is described (refer to FIGS. 5 to 7).

(Case A; FIG. 5)

At an initial state of a case A of FIG. 5, the first WFDNW is established in which the PC 120 is a G/O device and the MFPs 10, 110 and the portable terminal 50 are CL devices. In the meantime, the participation list includes the respective device information of the MFP 10, the portable terminal 50 and the MFP 110 in order from the higher level.

In S300, the PC 120 that is a G/O device is disconnected from the first WFDNW. Thereby, the first WFDNW that is established at the initial state of FIG. 5 is extinguished. In this case, in S302, the MFP 10 confirms that the PC 120 is disconnected from the first WFDNW and shifts the state of the MFP 10 from the CL state to the device state.

Likewise, in S304, the confirmation unit 85 of the portable terminal 50 confirms that the PC 120 is disconnected from the first WFDNW and shifts the state of the portable terminal 50 from the CL state to the device state. That is, the confirmation unit 85 changes the WFD state value in the memory 74 from a value indicating the CL state to a value indicating the device state and deletes the WFDWSI in the memory 74 (i.e., the WS1 of FIG. 3). In the meantime, the participation list is not deleted from the memory 74 and is kept in the memory 74.

Also, in S306, the MFP 110 confirms that the PC 120 is disconnected from the first WFDNW and shifts the state of the MFP 110 from the CL state to the device state. Since the respective devices 10, 50, 110 operate at the device state, the respective devices cannot perform wireless communication of target data. For example, the portable terminal 50 cannot transmit print data to the MFP 10 (or MFP 110).

In S308, the user starts the application 76 of the portable terminal 50 and then provides a printing instruction to the portable terminal 50 in accordance with a screen displayed by the application 76 (for example, the user selects an item indicating 'print'). The printing instruction includes the user's selection of data (i.e., print data) of a print target stored in the portable terminal 50.

The application 76 of the portable terminal 50 beforehand stores the model names of the MFPs 10, 110 (i.e., model names of various products manufactured by the vendors of the MFPs 10, 110). In S310, a display control unit 89 of the portable terminal 50 extracts node names associated with the model names of the MFPs 10, 110 from the participation list in the memory 74, thereby extracting respective node names of the MFPs 10, 110. Then, the display control unit 89 generates an MFP list including the respective node names of the MFPs 10, 110 and displays the MFP list on the display unit 54.

In S312, the user applies, to the operation unit 52, a selection instruction for selecting the node name of the MFP 10 from the MFP list. In this case, in S314, a forming unit 86 of the portable terminal 50 shifts the state of the portable terminal 50 from the device state to the G/O state without executing the G/O negotiation. As described above, when newly establishing a WFDNW, the G/O negotiation is generally executed, so that a G/O device and a client device are determined. In S314, the forming unit 86 shifts the state of the portable terminal 50 from the CL state to the G/O state without executing the G/O negotiation. When the processing of S314 is executed, the portable terminal 50 becomes a G/O device. However, a client device does not exist. In other words, when the processing of S314 is executed, it can be said that a WFDNW (hereinafter, referred to as 'second WFDNW') to which only a G/O device (i.e., the portable terminal 50) belongs is newly formed.

More specifically, in S314, the forming unit 86 changes the WFD state value in the memory 74 from a value indicating the device state to a value indicating the G/O state. The forming unit 86 also prepares a WFDWSI (hereinafter, referred to as 'WS2'), which should be used in the second WFDNW, and stores the WS2 in the memory 74.

Then, in S316, a transmission unit 82 of the portable terminal 50 first extracts the MAC address of the MFP 10, which is associated with the node name of the MFP 10 selected by the user in S312, from the participation list. Then, the transmission unit 82 transmits an Invitation Request signal (hereinafter, referred to as 'Ireq signal'), which includes the MAC address of the MFP 10 as a transmission destination.

The Ireq signal is a signal that is transmitted by the G/O device (for example, the portable terminal 50). The Ireq signal is a signal for requesting that a transmission destination device (for example, the MFP 10) of the Ireq signal newly belong to the existing WFDNW, as a CL device, to which a transmission source device (for example, the G/O device) of the Ireq signal belongs. Therefore, in S316, the portable terminal 50 can request that the MFP 10 newly belong to the second WFDNW, as a CL device.

When the MFP 10 receives the Ireq signal from the portable terminal 50, the MFP 10 transmits an Invitation Response signal (hereinafter, referred to as 'Ires signal') to the portable terminal 50. Therefore, in S318, an establishment unit 84 of the portable terminal 50 receives the Ires signal from the MFP 10. Then, in S320, the establishment unit 84 supplies the WFDWSI of the second WFDNW (i.e., WS2) to the MFP 10. As a result, connection is established between the MFP 10 and the portable terminal 50.

In S322, the MFP 10 shifts the state of the MFP 10 from the device state to the CL state. Thereby, the MFP 10 newly participates in the second WFDNW, as a CL device.

In the meantime, when the connection is established between the MFP 10 and the portable terminal 50, predetermined information is supplied from the portable terminal 50 to the MFP 10. The predetermined information is information indicating that a printing instruction has been provided to the portable terminal 50. Thereby, even when a result of the determination in S10 of FIG. 2 is YES, the MFP 10 can know that a printing instruction has been provided to the portable terminal 50 (YES in S11). As a result, the MFP 10 does not execute the processing of S12 to S18. Since the MFP 10 does not generate a new participation list, the MFPs 10, 110 and the portable terminal 50 can continue to use the old participation list (i.e., the participation list in which the information about the respective CL devices in the first WFDNW is described).

As specifically described later, when the communication of print data (S324) is over, the second WFDNW is extinguished (S328, S330). That is, the second WFDNW is a WFDNW that is temporarily formed so as to perform communication of the print data between the MFP 10 and the portable terminal 50 when a printing instruction is applied to the portable terminal 50. Therefore, in this illustrative embodiment, when the CL device (the MFP 10 in the case A of FIG. 5) participates in the temporary WFDNW (i.e., YES in S11 of FIG. 2), the determination of S11 in FIG. 2 is provided not to execute the generation of the participation list (S14), the transmission of the participation notification (S16) and the reception of the participation list (S18). Thereby, the MFPs 10, 110 and the portable terminal 50 can continue to use the old participation list (i.e., the participation list in which the information about the respective CL devices is described) generated while the first WFDNW exists.

Then, in S324, a communication execution unit 87 of the portable terminal 50 transmits the print data, which is stored in the portable terminal 50, to the MFP 10 by using the second WFDNW, without through the other apparatus. Thereby, the MFP 10 receives the print data from the portable terminal 50 and prints an image, which is expressed by the print data, on a printing medium. As a result, it is possible to provide the printed printing medium to the user.

In S326, when the communication of the print data is over, an extinction unit 88 of the portable terminal 50 transmits a disconnection signal, which indicates that the portable terminal 50 is disconnected from the second WFDNW, to the MFP 10. Then, in S328, the extinction unit 88 shifts the state of the portable terminal 50 from the G/O state to the device state. That is, the extinction unit 88 stores the WFD state value indicating the device state in the memory 74 and deletes the WS2 from the memory 74. As a result, the second WFDNW is extinguished.

Also, in S330, when the MFP 10 receives the disconnection signal from the portable terminal 50, the MFP 10 shifts the state of the MFP 10 from the G/O state to the device state. Like this, in this illustrative embodiment, since the second WFDNW is extinguished, it is possible to reduce processing loads of the MFP 10 and the portable terminal 50, compared to a configuration where the second WFDNW is maintained. For example, the portable terminal 50 may operate as the G/O device, so that it doesn't have to execute the processing of managing the CL device. However, in a modified embodiment, the portable terminal 50 may not transmit the disconnection signal to the MFP 10. That is, a configuration where the second WFDNW is maintained may be adopted.

Effects of First Illustrative Embodiment

As shown in FIG. 3, the portable terminal 50 receives the participation list including the device information of the MFP 10 through the PC 120 (i.e., a G/O device) and stores the participation list in the memory 74 (S18 in FIG. 2). Then, as shown in FIG. 5, when the PC 120 (i.e., a G/O device) is disconnected from the first WFDNW (S300) and the printing instruction and the selection instruction of the MFP 10 are provided (S308, S312), the portable terminal 50 forms the second WFDNW to which the portable terminal 50 belongs as a G/O device (S314).

In the meantime, even though the PC 120 (i.e., a G/O device) is disconnected from the first WFDNW, when the printing instruction and the selection instruction of the MFP 10 are not provided, the portable terminal 50 does not execute the processing after S314 (i.e., the portable terminal 50 is not shifted to the G/O state and does not transmit the Ireq signal). Also, when the printing instruction and the selection instruction of the MFP 10 are provided at a state where the PC 120 (i.e., a G/O device) is not disconnected from the first WFDNW, the portable terminal 50 does not execute the processing after S314 and transmits the print data to the MFP 10 through the PC 120 by using the first WFDNW.

When the portable terminal 50 forms the second WFDNW, the portable terminal transmits the Ireq signal to the MFP 10 by using the MAC address of the MFP 10 in the participation list (S316) and supplies the WS2 to the MFP 10 (S320). Thereby, the portable terminal 50 can appropriately establish the state where the MFP 10 and the portable terminal 50 belong to the second WFDNW. In order to enable the MFP 10 to execute a printing operation, the portable terminal 50 transmits the print data to the MFP 10 by using the second WFDNW, without through the other apparatus (S324). The portable terminal 50 can automatically form the second WFDNW to thereby appropriately transmit the print data to the MFP 10 even though the user does not apply the WFD connection operation (refer to FIG. 3) to the MFP 10 and the portable terminal 50.

(Correspondence Relation)

The portable terminal 50, the PC 120 and the MFP 10 are examples of the 'communication apparatus', the 'master station device' and the 'first device', respectively. The MFPs 10, 110 and the portable terminal 50 are examples of the 'plurality of slave station devices'. The first WFDNW and the second WFDNW are examples of the 'first wireless network' and the 'second wireless network', respectively. The state where the MFP 10 and the portable terminal 50 belong to the second WFDNW is an example of the 'specific state'.

The MAC address of the MFP 10 is an example of the 'identification information of the first device'. The node names of the MFPs 10, 110 included in the MFP list (S310) are an example of the 'one or more relation information'. The printing instruction (S308) and the selection operation (S312) are examples of the 'specific instruction'. The print data is an example of the 'target data'. Also, the Ireq signal, the G/O existence confirmation signal and the WS2 are examples of the 'first type command', the 'predetermined signal' and the 'wireless setting information', respectively.

Second Illustrative Embodiment

Subsequently, a second illustrative embodiment is described with reference to FIGS. 6 and 7. In this illustrative embodiment, a G/O Negotiation Request signal (hereinafter, referred to as 'G/ONego signal') is used instead of the Ireq signal. The G/ONego is a signal for requesting execution of the G/O negotiation.

(Case B; FIG. 6)

Figure 6:
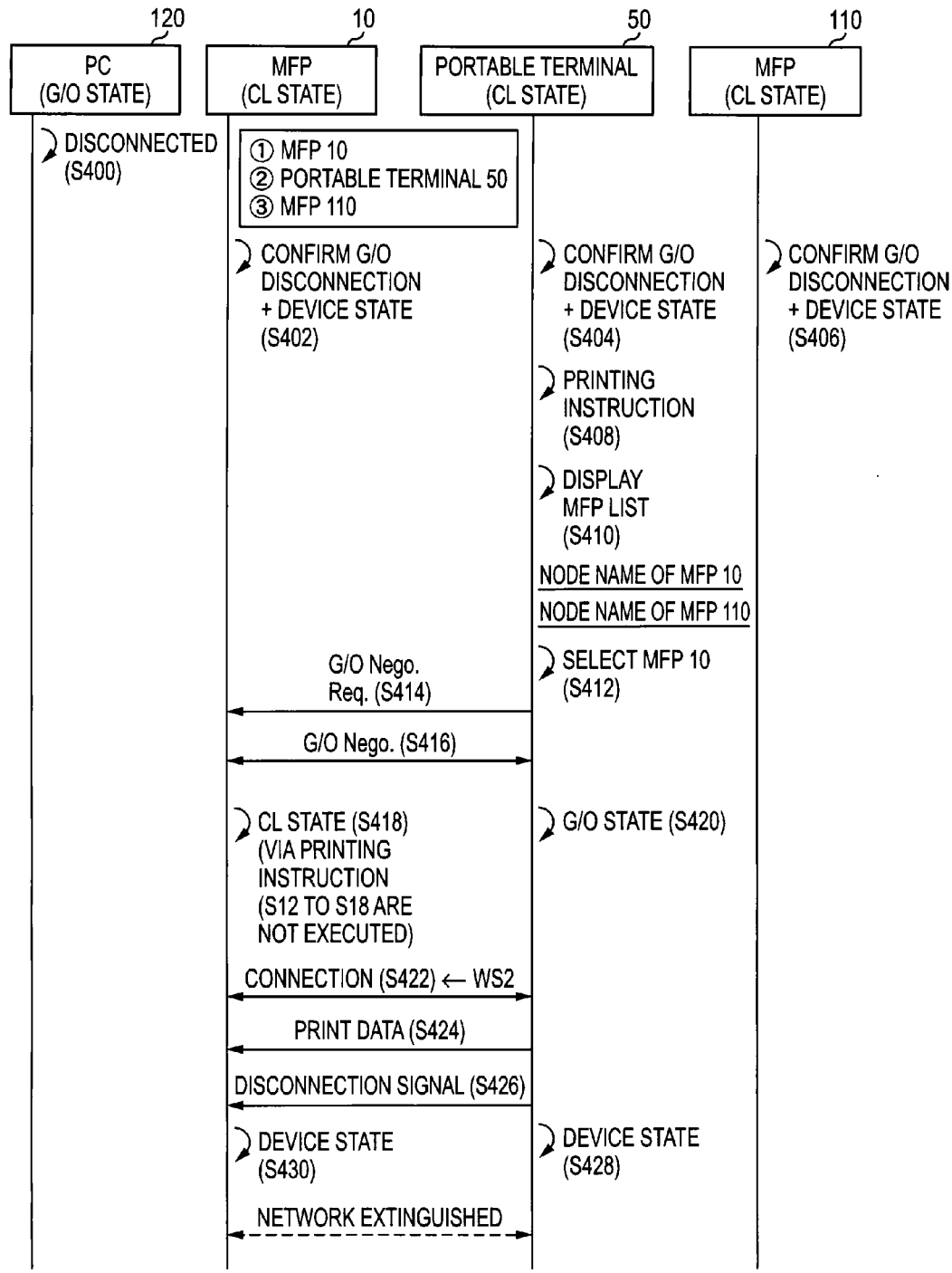
FIG. 6 is a sequence diagram of a case B (i.e., a case where a portable terminal becomes a G/O device as a result of G/O negotiation) of a second illustrative embodiment.

An initial state of FIG. 6 is a state where the first WFDNW is established, like the initial state of FIG. 5. The processing of S400 to S412 is the same as that of S300 to S312 of FIG. 5.

In S414, the transmission unit 82 of the portable terminal 50 transmits a G/ONego signal, which includes the MAC address of the MFP 10 in the participation list as a transmission destination. Thereby, in S416, the establishment unit 84 of the portable terminal 50 executes the G/O negotiation with the MFP 10. In S418, the MFP 10 determines that the MFP 10 becomes at the CL state as a result of the G/O negotiation, and shifts the state of the MFP 10 from the device state to the CL state. Also, in S420, the establishment unit 84 of the portable terminal 50 determines that the portable terminal 50 becomes at the G/O state as a result of the G/O negotiation, and shifts the state of the portable terminal 50 from the device state to the G/O state.

Then, in S422, the establishment unit 84 of the portable terminal 50 supplies the MFP 10 with the WDFWSI of the second WFDNW (i.e., the WS2) to which the portable terminal 50 belongs as a G/O device as a result of the G/O negotiation. As a result, connection is established between the MFP 10 and the portable terminal 50. After that, the predetermined information indicating that a printing instruction is provided to the portable terminal 50 is supplied from the portable terminal 50 to the MFP 10, which is the same as the first illustrative embodiment. Thereby, even when a result of the determination in S10 of FIG. 2 is YES, the MFP 10 determines YES in S11 and does not execute the processing of S12 to S18. The respective processing thereafter (i.e., S424 to S430) is the same as that of S324 to S330 in FIG. 5.

(Case C; FIG. 7)

Figure 7:
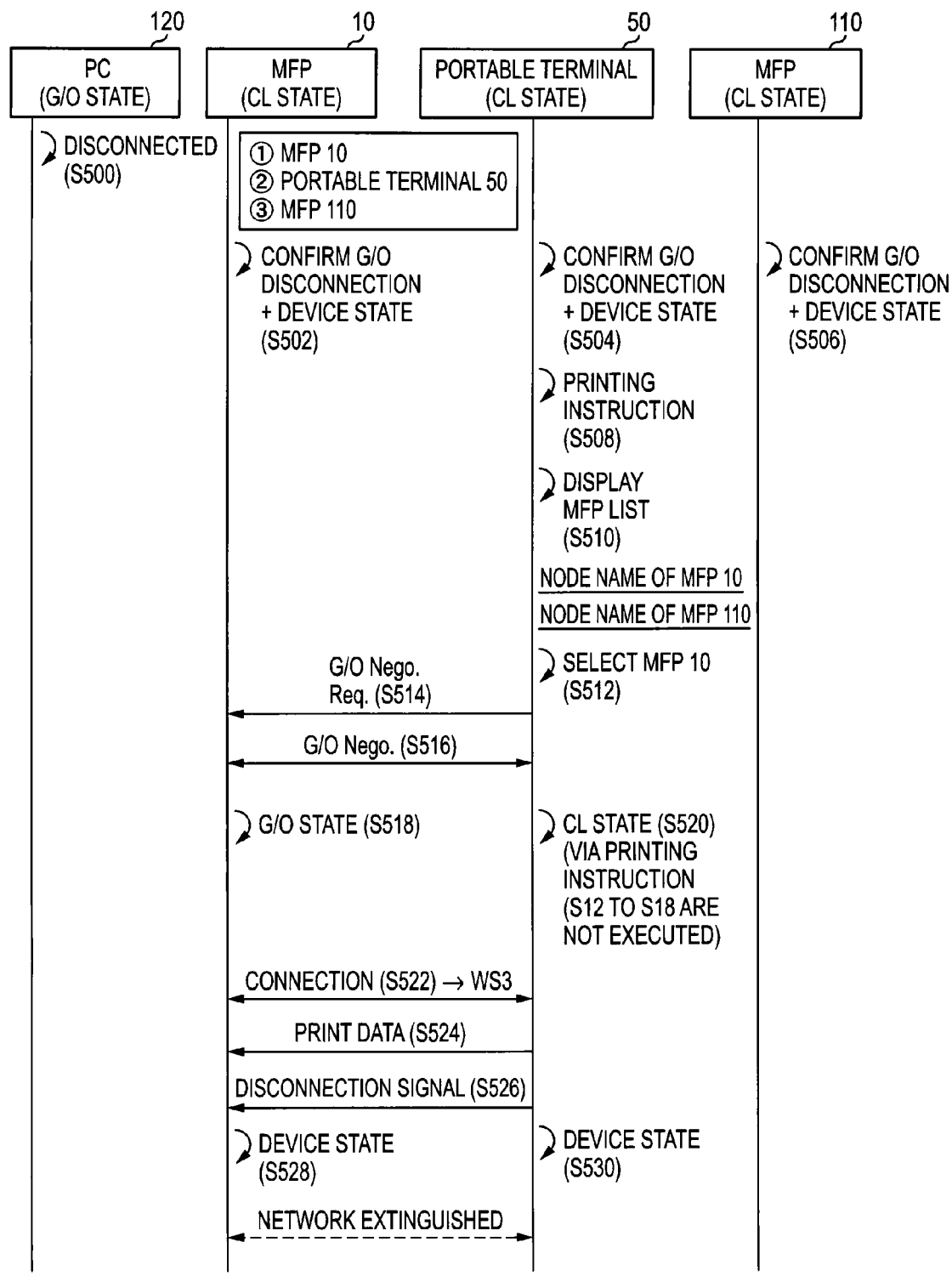
FIG. 7 is a sequence diagram of a case C (i.e., a case where a portable terminal becomes a CL device as a result of G/O negotiation) of the second illustrative embodiment.

A case C of FIG. 7 is different from the case B of FIG. 6, in that a result of the G/O negotiation is different. The processing of S500 to S516 is the same as that of S400 to S416 of FIG. 6.

In S518, the MFP 10 determines that the MFP 10 becomes at the G/O state as a result of the G/O negotiation, and shifts the state of the MFP 10 from the device state to the G/O state. Also, in S520, the establishment unit 84 of the portable terminal 50 determines that the portable terminal 50 becomes at the CL state as a result of the G/O negotiation, and shifts the state of the portable terminal 50 from the device state to the CL state. The portable terminal 50 is shifted from the device state to the CL state as a printing instruction is provided. Therefore, even when a result of the determination in S10 of FIG. 2 is YES, the portable terminal 50 determines YES in S11 and does not execute the processing of S12 to S18.

Then, in S522, the MFP 10 supplies the portable terminal 50 with the WDFWSI of a third WFDNW (i.e., the WS3) to which the MFP 10 belongs as a G/O device as a result of the G/O negotiation. As a result, connection is established between the MFP 10 and the portable terminal 50. The respective processing thereafter (i.e., S524 to S530) is the same as that of S424 to S430 in FIG. 6.

Effects of Second Illustrative Embodiment

As shown in FIGS. 6 and 7, when the PC 120 (i.e., a G/O device) is disconnected from the first WFDNW (S400, S500) and the printing instruction and the selection instruction of the MFP 10 are provided to the portable terminal 50 (S408, S412, S508, S512), the portable terminal 50 transmits the G/ONego signal to the MFP 10 (S414, S514). Therefore, the portable terminal 50 executes the G/O negotiation with the MFP 10 (S416, S516) to thereby determine at which state of the G/O state and the CL state the portable terminal 50 becomes.

When it is determined that the portable terminal 50 becomes at the G/O state (S420 in FIG. 6), the portable terminal 50 supplies the WFDWSI of the second WFDNW (i.e., the WS2) to the MFP 10 (S522), thereby establishing a state where the MFP 10 and the portable terminal 50 belong to the second WFDNW. On the other hand, when it is determined that the portable terminal 50 becomes at the CL state (S520 in FIG. 7), the portable terminal 50 acquires the WFDWSI of the third WFDNW (i.e., the WS3) from the MFP 10 (S522), thereby establishing a state where the MFP 10 and the portable terminal 50 belong to the third WFDNW. The portable terminal 50 executes the appropriate processing in accordance with the result of the G/O negotiation, thereby appropriately establishing a state where the MFP 10 and the portable terminal 50 belong to the same WFDNW. That is, even when the user does not apply the WFS connection operation (refer to FIG. 3) to the MFP 10 and the portable terminal 50, the portable terminal 50 can automatically form the WFDNW to which the MFP 10 and the portable terminal 50 belong, thereby appropriately transmitting the print data to the MFP 10.

(Correspondence Relation)

The G/ONego signal is an example of the 'first type command'. The WS2 of FIG. 6 and the WS3 of FIG. 7 are examples of the 'first wireless setting information' and the 'second wireless setting information', respectively. In the case B of FIG. 6, the first WFDNW and the second WFDNW are examples of the 'first wireless network' and the 'second wireless network', respectively. Also, in the case C of FIG. 7, the first WFDNW and the third WFDNW are examples of the 'first wireless network' and the 'second wireless network', respectively.

Although the specific illustrative embodiments of the invention have been specifically described, they are just exemplary and do not limit the claims. The technology defined in the claims includes a variety of modifications and changes to the above illustrative embodiments. In the following, modified embodiments of the above illustrative embodiments are enumerated.

Modified Embodiment 1

For example, in the case A of FIG. 5, when an operation for turning off the power supply of the PC 120 is applied, the PC 120 (i.e., a G/O device) may transmit a disconnection signal, which indicates that the PC 120 is disconnected from the first WFDNW, to the respective devices 10, 50, 110. In this case, when the respective devices 10, 50, 110 receive the disconnection signal from the PC 120, the respective devices may be shifted to the device state (S302 to S306). That is, the respective devices 10, 50, 110 can know that the PC 120 is disconnected from the first WFDNW, even though the G/O existence confirmation signal (refer to FIG. 4) is not transmitted. Therefore, the confirmation unit 85 of the portable terminal 50 may be omitted.

Modified Embodiment 2

In the above illustrative embodiments, the display control unit 89 displays the MFP list including the node names of all the MFPs in the participation list (S310 of FIG. 5, S410 of FIG. 6, S510 of FIG. 7). Instead of this, the display control unit 89 may display an MFP list including only a node name of the MFP, which is a transmission destination to which the portable terminal 50 has transmitted the print data, of the node names of all the MFPs in the participation list. Also, the display control unit 89 may display an MFP list including only a node name, which is selected in advance by a user, of the node names of all the MFPs in the participation list. That is, the 'one or more relation information' is not limited to the node names of all the MFPs in the participation list and may be a part of the node names in the participation list. Also, the 'relation information' is not limited to the node name of the device and may be a user name of a user using the device, a model name of the device, and the like. That is, the 'relation information' may be information relating to the device.

Modified Embodiment 3

In the above illustrative embodiments, the example where the print data is transmitted from the portable terminal 50 to the MFP 10 has been described. However, the technology of the illustrative embodiments can be also applied to communication of data different from the print data. For example, scan data may be transmitted from the MFP 10 to the portable terminal 50. Also, the technology of the above illustrative embodiments can be also applied to communication of data (for example, voice data, moving picture data and the like) different from the print data and the scan data. That is, the target data is not limited to the print data and may be scan data, voice data, moving picture data and the like.

Modified Embodiment 4

The method with which the portable terminal 50 at the CL state acquires the device information of the other devices (for example, the MFPs 10, 110) at the CL state is not limited to the method of executing the participation list managing processing of FIG. 2. For example, when the WFDNW to which the portable terminal 50 and the MFPs 10, 110 belong as the CL devices is formed, the control unit 70 may broadcast a request packet of the device information to the WFDNW at predetermined timing (for example, periodically). In this case, when the MFP 10 receives the request packet, the MFP 10 transmits a response packet, which includes the device information of the MFP 10, to the portable terminal 50. Thereby, the reception unit 81 can receive the device information of the MFP 10 from the MFP 10 through the G/O device. Likewise, the reception unit 81 can receive the device information of the MFP 110 from the MFP 110.

Modified Embodiment 5

The 'master station' is not limited to the G/O device of the WFD and may be any device insomuch as it is a device (for example, a device capable of relating wireless communication between respective devices belonging to a wireless network) managing the respective devices belonging to the wireless network. Also, the 'slave station' is not limited to the CL device of the WFD and may be any device insomuch as it is a device that is managed from the master station in the wireless network and can perform communication of target data (print data and the like).

Modified Embodiment 6

The 'communication apparatus' and the 'slave station device (first device) are not limited to the portable terminal 50 and the MFP 10 and may be other communication apparatus (for example, a printer, a scanner, a FAX apparatus, a copier, a phone, a desktop PC, a server and the like). Also, the 'master station device' is not limited to the PC 120 and may be other communication apparatus (for example, an MFP, a printer, a scanner, a FAX apparatus, a copier, a portable terminal and the like).

Modified Embodiment 7

In the above illustrative embodiments, the CPU 72 of the portable terminal 50 executes the programs (i.e., software) in the memory 74, thereby implementing the respective units 81 to 89. Instead of this, at least one of the respective units 81 to 89 may be implemented by hardware such as a logical circuit and the like.

Also, the technical elements illustrated in the specification or drawings exhibit the technical availability individually or by a variety of combinations thereof and are not limited to the combinations defined in the claims at the time of filing the application. Also, the technology exemplified in the specification or drawings achieves a plurality of purposes at the same time and the achievement of any one purpose has the technical availability.

What is claimed is:

1. A communication apparatus comprising:
    a processor; and
    memory storing instructions that, when executed by the processor, causes the processor to execute:
        receiving identification information of a device from the device through a master station device, at a state where a first wireless network, to which a master station device and a plurality of slave station devices belong, is established, wherein the device is one of the plurality of slave station devices;
        registering the identification information of the device with the memory of the communication apparatus;
    transmitting a type command to the device by using the identification information of the device registered in the memory, in a specific case where the master station device is disconnected from the first wireless network and a specific instruction to perform communication of target data with the device is provided, a type command to the device by using the identification information of the device in the memory the type command being a command for establishing a state where a transmission source device, from which the type command is transmitted, and a transmission destination device, to which the type command is transmitted, belong to a same wireless network;
        establishing a specific state, when the type command is transmitted to the device, wherein the specific state is a state where the communication apparatus and the device belong to a second wireless network different from the first wireless network; and
        performing, when the specific state has been established, communication of the target data with the device by using the second wireless network.

2. The communication apparatus according to claim 1, wherein instructions further cause the processor to execute
    confirming whether the master station device is disconnected from the first wireless network by transmitting a predetermined signal to the master station device to thus determine whether a response signal is received from the master station device,
    wherein in case of the specific case where it is confirmed that the master station device is disconnected from the first wireless network and the specific instruction is provided, the transmission source device transmits the type command to the device.

3. The communication apparatus according to claim 1,
wherein the type command is a command to request that a transmission destination device, to which the type command is transmitted, newly belongs to a wireless network to which a transmission source device, from which the type command is transmitted, already belongs as a master station, as a slave station,
wherein instructions further cause the processor to execute:
establishing, for the specific case, the second wireless network to which the communication apparatus belongs as a master station,
transmitting the type command to the device after the second wireless network is newly formed in the specific case, and
establishing the state by supplying the device with wireless setting information, which is used in the second wireless network.

4. The communication apparatus according to claim 1,
wherein the type command is a command for requesting execution of negotiation communication for determining that each of a transmission source device and a transmission destination device, to which the type command is transmitted, becomes which of a master station and a slave station of a not-established wireless network, and
wherein when the type command is transmitted to the device,
wherein instructions further cause the processor to execute performing the negotiation communication with the device to determine that the communication apparatus becomes which of a master station and a slave station of the second wireless network,
wherein when it is determined as a result of the negotiation communication that the communication apparatus becomes the master station of the second wireless network, instructions further cause the processor to execute supplying the device with first wireless setting information that is used in the second wireless network, thereby establishing the specific state, and
wherein, when it is determined as a result of the negotiation communication that the communication apparatus becomes the slave station of the second wireless network, instructions further cause the processor to execute acquiring second wireless setting information, which is used in the second wireless network, from the device, thereby establishing the specific state.

5. The communication apparatus according to claim 1, wherein instructions further cause the processor to execute extinguishing the second wireless network when communication of the target data is over.

6. The communication apparatus according to claim 1, wherein instructions further cause the processor to execute displaying one or more relation information, which relates to one or more devices that are candidates for performing communication of the target data, on a display unit,
wherein the specific instruction is provided when one relation information relating to the device is selected from the one or more relation information.

7. A non-transitory computer-readable medium having instructions to control a communication apparatus to perform operations comprising:
receiving identification information of a device from the device through a master station device, at a state where a first wireless network, to which a master station device and a plurality of slave station devices belong, wherein the device is one of the plurality of slave station devices, has been established;
registering the identification information of the device with a memory of the communication apparatus;
transmitting a type command to the device by using the identification information of the device registered in the memory, in a specific case where the master station device is disconnected from the wireless network and a specific instruction to perform communication of target data with the device is provided, a type command to the device by using the identification information of the device in the memory the type command being a command for establishing a state where a transmission source device, from which the type command is transmitted, and a transmission destination device, to which the type command is transmitted, belong to a same wireless network;
establishing a specific state, when the type command is transmitted to the device, wherein the specific state is a state where the communication apparatus and the device belong to a second wireless network different from the first wireless network; and
performing, when the specific state has been established, communication of the target data with the device by using the second wireless network.

* * * * *